(12) United States Patent
Albert

(10) Patent No.: US 9,585,411 B2
(45) Date of Patent: *Mar. 7, 2017

(54) MARBLED SURFACE CHOCOLATE PRODUCT

(75) Inventor: Bradley S. Albert, Bangor, PA (US)

(73) Assignee: Mars, Incorporated, McLean, VA (US)

(*) Notice: Subject to any disclaimer, the term of this patent is extended or adjusted under 35 U.S.C. 154(b) by 1876 days.

This patent is subject to a terminal disclaimer.

(21) Appl. No.: 11/502,829

(22) Filed: Aug. 10, 2006

(65) Prior Publication Data

US 2007/0059433 A1    Mar. 15, 2007

Related U.S. Application Data

(60) Provisional application No. 60/707,302, filed on Aug. 10, 2005.

(51) Int. Cl.
| | |
|---|---|
| A23G 3/00 | (2006.01) |
| A23G 1/00 | (2006.01) |
| A23G 1/30 | (2006.01) |
| A23G 1/48 | (2006.01) |
| A23G 1/54 | (2006.01) |
| A23G 3/34 | (2006.01) |
| A23G 1/50 | (2006.01) |

(52) U.S. Cl.
CPC ........... *A23G 1/0006* (2013.01); *A23G 1/305* (2013.01); *A23G 1/48* (2013.01); *A23G 1/50* (2013.01); *A23G 1/54* (2013.01); *A23G 3/0085* (2013.01); *A23G 3/0095* (2013.01); *A23G 3/0097* (2013.01); *A23G 2220/00* (2013.01); *A23V 2002/00* (2013.01)

(58) Field of Classification Search
CPC . A23G 1/305; A23G 1/50; A23G 1/54; A23G 3/0085; A23G 3/0095; A23G 3/0097; A23G 1/48; A23G 1/0006
USPC .................................................. 426/660, 103
See application file for complete search history.

(56) References Cited

U.S. PATENT DOCUMENTS

| | | |
|---|---|---|
| 3,152,908 A | 10/1964 | Wiseman et al. |
| 5,571,547 A | 11/1996 | Serpelloni et al. |
| 5,858,078 A | 1/1999 | Andes et al. |

(Continued)

FOREIGN PATENT DOCUMENTS

| | | |
|---|---|---|
| FR | 2731876 | 9/1996 |
| JP | 48-40970 | 6/1973 |

(Continued)

OTHER PUBLICATIONS

Chocolate, Cocoa, and Confectionery Science and Technology, 3rd Edition, 1999, pp. 184, 221-224, 506, 608-609, and 613.

(Continued)

*Primary Examiner* — Vera Stulii
(74) *Attorney, Agent, or Firm* — Mars, Incorporated; Jason O'Leary

(57) ABSTRACT

The present invention is directed to a panned confectionery product comprising a chocolate piece having a color adherent coating on a surface of the chocolate piece, wherein the coating comprises a color adherent coating solution selected from the group consisting of a chocolate polish and a confectionery glaze and at least one edible colorant adhered to the coating solution.

15 Claims, 5 Drawing Sheets
(5 of 5 Drawing Sheet(s) Filed in Color)

(56) References Cited

U.S. PATENT DOCUMENTS

| | | |
|---|---|---|
| 2004/0021757 A1 | 2/2004 | Shastry et al. |
| 2004/0033293 A1 | 2/2004 | Albert |
| 2004/0166206 A1* | 8/2004 | Archibald et al. ............ 426/106 |
| 2004/0166214 A1 | 8/2004 | Gesford et al. |
| 2004/0175489 A1* | 9/2004 | Clark et al. ................... 426/660 |
| 2004/0202755 A1* | 10/2004 | Myers .................. A23G 3/0097 426/249 |
| 2006/0257551 A1* | 11/2006 | Huzinec et al. .............. 426/660 |

FOREIGN PATENT DOCUMENTS

| | | |
|---|---|---|
| JP | 61-249350 | 11/1986 |
| JP | 1-273545 | 11/1989 |
| WO | 00/03609 | 1/2000 |
| WO | 2004012518 | 2/2004 |
| WO | 2004/080193 | 9/2004 |

OTHER PUBLICATIONS

Japanese Office Action issued in counterpart application No. 2008-526251, dated Jan. 5, 2011, along with its English language translation—6 pages.

\* cited by examiner

MARBLED SURFACE CHOCOLATE PRODUCT

CROSS-REFERENCE TO RELATED APPLICATION

This application claims the benefit of U.S. Provisional Application Ser. No. 60/707,302 filed on Aug. 10, 2005, the contents of which are incorporated by reference.

BACKGROUND OF THE INVENTION

Field of the Invention

The present invention relates to a panned confectionery product having a chocolate piece that is coated with a color adherent coating solution and an edible colorant. More particularly, in the present invention, the color adherent coating solution is applied on a surface of the chocolate piece, and the edible colorant is applied to adhere to the color adherent coating solution.

Description of the Related Art

Applying a sugar shell coating around a chocolate center is well known in the art. The sugar shell coating provides a colored surface over the chocolate center, forming a colorful product with a crunchy texture.

However, a crunchy texture is not always desirable. Moreover, the process for creating a sugar shell is very complicated and rather time consuming. A chocolate panned confectionery product having a colored surface that is not a sugar shell would provide an alternative product design that is aesthetically pleasing and that need not be crunchy.

Another method of imparting color to chocolate is by taking white chocolate and adding a colorant to the white chocolate. However, this has its drawbacks, since the colored chocolate will not meet the Code of Federal Regulations Standard of Identity for chocolate in the U.S. and therefore cannot be labeled as chocolate.

The present inventor, while attempting to find new ways of completely coloring the outside surface of chocolate pieces, discovered that the surface of chocolate pieces could be colored in a random non-continuous adhesive pattern by employing the methods described below.

SUMMARY OF THE INVENTION

The present invention is directed to a panned confectionery product comprising a chocolate piece having a color adherent coating on a surface of the chocolate piece, where the color adherent coating is comprised of colorant particles having an average particle size less than about 150 microns and which are randomly distributed across the surface of the chocolate piece providing a random variation in colorant particle density across the surface, and a color adherent coating solution selected from the group consisting of a chocolate polish and a confectionery glaze. The panned confectionery product has a colored surface that preferably has a random non-continuous adhesive pattern resembling a faux marbled appearance.

The present invention includes a process for manufacturing a panned confectionery product of the invention, comprising the steps of (a) providing a mass of chocolate pieces to a mixing pan; (b) mixing the mass of chocolate pieces in the mixing pan; (c) applying a color adherent coating solution selected from the group consisting of a chocolate polish or a confectionery glaze to the mass of chocolate pieces in an amount effective to wet the pieces; (d) applying an edible dry colorant having an average particle size less than about 150 microns to the wetted pieces, thereby forming colored pieces having random variations in surface color density; (e) drying the colored pieces by introducing a drying gas into the mixing pan, thereby forming dried colored pieces with the random variation in surface color density; and (f) optionally, repeating steps (c), (d) and (e) at least once, preferably with an edible dry colorant of a different color.

In another embodiment, a process for manufacturing a panned confectionery product of the invention comprises the steps of (a) providing a mass of chocolate pieces to a mixing pan; (b) mixing the mass of chocolate pieces in the mixing pan; (c) applying, in a simultaneous manner, an effective amount of a color adherent coating solution selected from the group consisting of a chocolate polish or a confectionery glaze, and an effective amount of an edible colorant to the mass of chocolate pieces, thereby forming colored pieces having random variations in surface color density; (d) drying the colored pieces by introducing a drying gas into the mixing pan; and (e) optionally, repeating steps (c) and (d) at least once. Preferably, step (e) is performed with an edible colorant of the same color.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee.

DETAILED DESCRIPTION OF THE INVENTION

The term "chocolate" is intended to refer to all chocolate or chocolate-like compositions with a fat phase or fat-like composition. The term is intended, for example, to include standardized and non-standardized chocolates, i.e., including chocolates with compositions conforming to the U.S. Standards Of Identity (SOI) and compositions not conforming to the U.S. Standards Of Identity, respectively, including dark chocolate, baking chocolate, milk chocolate, sweet chocolate, semi-sweet chocolate, buttermilk chocolate, skim-milk chocolate, mixed dairy product chocolate, low fat chocolate, white chocolate, aerated chocolates, compound coatings, non-standardized chocolates and chocolate-like compositions, unless specifically identified otherwise.

In the United States, chocolate is subject to a standard of identity established by the U.S. Food and Drug Administration (FDA) under the Federal Food, Drug and Cosmetic Act. Definitions and standards for the various types of chocolate are well established in the U.S. Nonstandardized chocolates are those chocolates, which have compositions which fall outside the specified ranges of the standardized chocolates.

Chocolates also include those containing crumb solids or solids fully or partially made by a crumb process.

Nonstandardized chocolates result when, for example, the nutritive carbohydrate sweetener is replaced partially or completely; or when the cocoa butter, cocoa butter alternative, cocoa butter equivalent, cocoa butter extender, cocoa butter replacer, cocoa butter substitute or milkfat are replaced partially or completely; or when components that have flavors that imitate milk, butter or chocolate are added or other additions or deletions in formula are made outside the FDA standards of identify of chocolate or combinations thereof. Chocolate-like compositions are those fat-based compositions that can be used as substitutes for chocolate in applications such as panning, molding, or enrobing; for example, carob.

The present invention is a panned confectionery product, which has a colored surface. In a preferred embodiment, the colored surface has a random non-continuous adhesive pattern resembling a faux marbled appearance. The color adherent coating, which substantially surrounds the panned confectionery product is comprised of a color adherent coating solution and an edible colorant. The edible colorant adheres to the coating solution. In a preferred embodiment, a protectant coating, i.e., a confectionery glaze, surrounds the color adherent coating, providing a protective glossy layer. Optionally, more than one edible colorant may be used to produce the colored appearance on the surface of the panned confectionery product. In another preferred embodiment, the edible colorant is distributed over the chocolate surface in a randomized fashion such that the color intensity of the edible colorant varies over the surface of the confectionery product.

Figure 1:
FIG. 1 provides a top view of a panned confectionery product, which exemplifies the invention.
Figure 2:
FIG. 2 provides a top view of another panned confectionery product, which exemplifies the invention.
Figure 3:
FIG. 3 provides a top view of a panned confectionery product made by a process of the invention.

FIGS. 1, 2 and 3 provide examples of panned confectionery products of the invention, which generally have a marbled appearance on the surface of the chocolate piece.

Figure 4:
FIG. 4 provides a top view of a comparative panned confectionery product.
Figure 5:
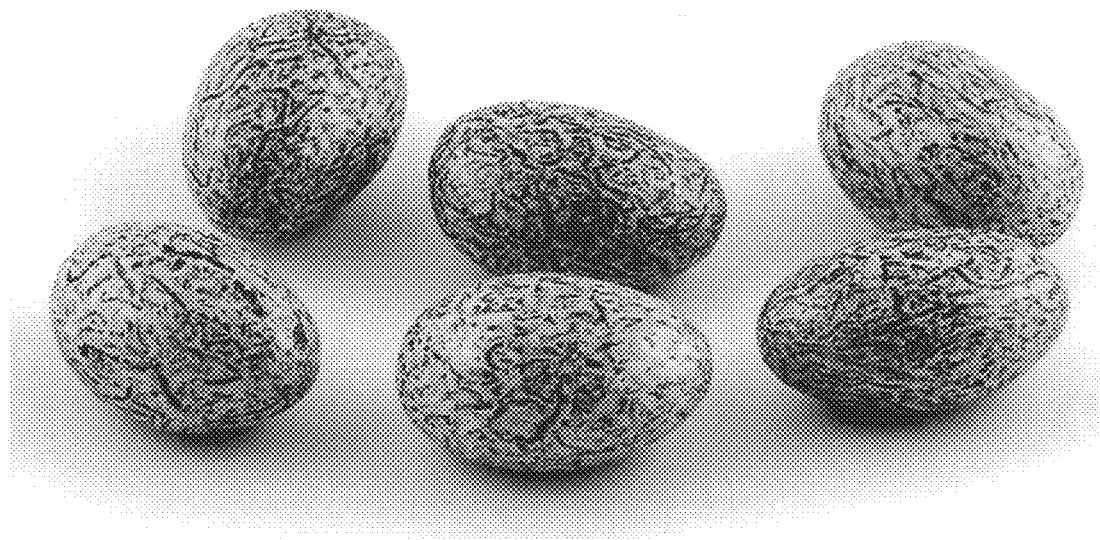
FIG. 5 provides a top view of another comparative panned confectionery product.

In contrast, FIGS. 4 and 5 provide examples of panned confectionery products that are not of the invention. That is, the products shown in FIGS. 4 and 5 do not have a marbled appearance on the surface of the chocolate piece.

The chocolate piece has a chocolate surface having curvature and, for example, may be round, pellet, egg or lentil-shaped. Particularly preferred shapes are chocolate-coated nuts like almonds or peanuts, and bite-sized chocolate eggs. The chocolate piece may be solid chocolate or have one or more inclusions. The inclusion may be, for example, nuts, nut derivatives, fruits, fruit derivatives, cookie bits, caramel, nougat, malted milk balls, mixtures thereof, and the like.

The color adherent coating solution can be a chocolate polish or a confectionery glaze, which is applied as the chocolate pieces tumble and rub against one another, so that the coating solution "wets" the chocolate pieces.

In one embodiment, the color adherent coating solution is a chocolate polish, which is known in the art to be typically an aqueous-based gum system. Exemplary water-based polishes include, without limitation, CAPOL® 120C and CAPOL® 127C brand products available from Centerchem, Inc., Norwalk, Conn. CAPOL® 120C and CAPOL® 127C are compositions made with gum arabic, sucrose, corn syrup, modified starch, vegetable oil (coconut origin), citric acid and sorbic acid. However, CAPOL® 120C is more refined and has less of a yellow color. In the present invention, CAPOL® 120C is particularly preferred.

In another embodiment, a confectionery glaze may serve as the color adherent coating solution. The confectionery glaze may have low-carbon alcohols and/or shellacs and other resins to provide sufficient chocolate surface modification to improve the adherence of the edible colorant to the chocolate piece. Solvent-based glazes may also be useful.

Commercial names of exemplary water-based glazes include, without limitation, commercially available CAPOL® 153D and CAPOL® 150C products, available from Centerchem, Inc., Norwalk, Conn.

Alternatively, the confectionery glaze may be a blend of natural waxes.

The edible colorant may be any dye and/or colorant approved for human consumption in a food product, for example a dye and/or colorant approved under the U.S. Food, Drug and Cosmetic Act (FD&C). In addition, the dye or colorant is typically water-soluble.

A lake may be used as the edible colorant. Lakes comprise fine particles, such as aluminum hydroxide particles, bound to a colorant, such as one of the FD&C or natural colorants. Examples include, without limitation, FD&C Blue #1 Lake, FD&C Blue #2 Lake, FD&C Green #3 Lake, FD&C Yellow #5 Lake, FD&C Yellow #6 Lake, Erythrosine Lake, Amaranth Lake, Ponceau 4R Lake, Carmoisine Lake and FD&C Red 40 Lake, all of which may be obtained from, for example, the Color Group of Sensient Technologies Corporation, St. Louis, Mo.

The edible colorant for use with the invention can be an FD&C dye. The FD&C dyes include Red No. 3 (Erythrosine), Red No. 40 (Allura Red), Yellow No. 6 (Sunset Yel. FCF), Yellow No. 5 (Tartrazine), Green No. 3 (Fast Green FCF), Blue No. 1 (Brilliant Blue FCF), Blue No. 2 (Indigotine). Mixtures of these dyes may also be used.

In Europe, edible colorants (identified by their E-number) which are approved for use in food products, include, for example:

E 100 Curcumin
E 101 (i) Riboflavin
    (ii) Riboflavin-5'-phosphate
E 102 Tartrazine
E 104 Quinoline yellow
E 110 Sunset Yellow FCF; Orange Yellow S
E 120 Cochineal; Carminic acid; Carmines
E 122 Azorubine; Carmoisine
E 123 Amaranth
E 124 Ponceau 4R; Cochineal Red A
E 127 Erythrosine
E 128 Red 2G
E 129 Allura Red AC
E 131 Patent Blue V
E 132 Indigotine; Indigo Carmine
E 133 Brilliant Blue FCF
E 140 Chlorophylls and chlorophyllins
E 141 Copper complexes of chlorophyll and chlorophyllins
E 142 Green S
E 150a Plain caramel
E 150b Caustic sulphite caramel
E 150c Ammonia caramel
E 150d Sulphite ammonia caramel
E 151 Brilliant Black BN; Black PN
E 153 Vegetable carbon
E 154 Brown FK
E 155 Brown HT
E 160a Carotenes
E 160b Annatto; Bixin; Norbixin
E 160c Paprika extract; Capsanthian; Capsorubin
E 160d Lycopene
E 160e Beta-apo-8'-carotenal (C30)
E 160f Ethyl ester of beta-apo-8'-carotenoic acid (C30)
E 161b Lutein
E 161g Canthaxanthin
E 162 Beetroot Red; Betanin E 163 Anthocyanins
E 170 Calcium carbonate
E 171 Titanium dioxide
E 172 Iron oxides and hydroxides
E 173 Aluminium
E 174 Silver
E 175 Gold
E 180 Litholrubine BK The edible colorant may also be in the form of titanium dioxide and/or iron oxide coated on mica as in the composite "pearl effect" pigments sold under the brand name, CANDURIN®, which is supplied by EMD Chemicals Inc., Pigments Division, Hawthorne, N.Y., in the U.S. and Merck KGaA, Darmstadt, Germany, in Europe. These composite "pearl effect" pigments are generally approved for use in foods by some regions and countries of the world, including the European Union. However, at this time, they are not approved for use as color additives in food worldwide. Thus, in one particularly preferred embodiment, the edible colorant is substantially free of mica.

In a preferred embodiment, the edible colorant is provided in a dry powder form. Dry powders such as pigments, lake colors, and powdered dyes (substantially pure colorant) are preferably used.

Applying an edible dry colorant directly onto a wetted surface is a unique method of coating a confectionery product. By applying the dry colorant particles in this manner, the dry colorant particles remain substantially undissolved on the panned confectionery product. Preferably at least 50% of the dry colorant particles remain undissolved, more preferably at least 60%, even more preferably 70%, even more preferably at least 80%, still even more preferably 90%, still even more preferably at least 95%, still even more preferably 98%, and most preferably 99% remains undissolved. The result is a surface with varying color intensity created by the randomness of application and variation in density of the colorant particles that adhere to the product's surface over a given area. When multiple colors of dry colorant are used, each colorant appears to vary in color intensity independently from the other colorants due to its unique pattern and density of colorant particle adherence. The variation in color intensity of two or more different dry colorants produces a variegated or multicolored appearance at the surface of the chocolate pieces that mimics the appearance of marble, natural gemstones, or stone (see FIG. 1). Preferably, the dry colorant particles substantially cover the chocolate so that the chocolate is not visible on the surface of the confectionery product, and more than one color is visible on the surface of the product.

In practice, an edible colorant may be provided in a liquid suspension or in a liquid solution. With a liquid suspension, the density of the colorant particles is more or less uniform throughout the color adherent solution. With a liquid solution, the colorant is dissolved, so there are no solid particles.

However, there is a significant difference in the surface appearance of the resulting colored panned confections when using a colorant incorporated in a carrier, e.g., liquid suspension or liquid solution, versus a dry colorant. Using a liquid suspension or liquid solution creates a pattern of swirls and squiggles on the surface of the confectionery product, where the color intensity of the edible colorant is substantially uniform in the areas where the colorant is adhered to the surface and some variation is created by areas of varied thickness of the color adherent solution coating across the surface of the product, allowing the chocolate to show through in spots to varying degrees. This is evident in the panned confectionery product shown in FIG. 5, which does not have the desired marbled appearance of the invention. When applying the edible colorant in a liquid suspension or liquid solution, it is not desirable to apply coatings of different colors. In this case, each coating will mask the previous coating rather than allow the unaltered color of the previous applied coating to appear at the surface of the product.

The edible dry colorant has an average particle size of less than about 0.001 µm, preferably less than about 150 microns (µm), more preferably less than about 100 µm, and most preferably less than about 50 µm. In a particularly preferred embodiment, the average particle size of the edible dry colorant is in the range of from about 0.1 µm to about 25 µm, and most preferably from about 0.5 µm to about 5 µm.

There is a significant difference in the surface appearance of the resulting colored panned confections when using an edible dry colorant with a particle size greater than that contemplated by the invention. As seen in FIG. 4, the surface of the pieces takes on a speckled appearance rather than a marbled look. Such a confection is described in U.S. Patent Application Publication No. 2004/0033293.

In an alternative embodiment, the edible dry colorant may be made by incorporating a colorant into a liquid suspension or liquid solution. The dry colorant is formed by blending a colorant (e.g., pigment, lake color, or dye) with a carrier, drying the blend and creating a dry powder.

The panned confectionery product of the invention is manufactured in a panning apparatus that provides suitable mixing. The coating is applied in a panning operation. A detailed description of panning can be found in B. W. Minifie, "Chocolate, Cocoa, and Confectionery Science and Technology," $3^{rd}$ ed., (1999) pp. 184, 221-224, 506, 608-609, and 613, which are incorporated by reference. In the present invention, the chocolate pieces are soft panned, i.e., a hard panned sugar shell is not formed on the pieces.

The process for making the colored panned confectionery product includes the steps of (a) providing a mass of chocolate pieces to a mixing pan; (b) mixing the mass of chocolate pieces in the mixing pan; (c) applying a color adherent coating solution selected from the group consisting of a chocolate polish or a confectionery glaze to the mass of chocolate pieces in an amount effective to wet the pieces; (d) applying an edible dry colorant to the wetted pieces, thereby forming colored pieces wherein the colorant is randomly distributed on the chocolate pieces providing a random variation in colorant particle density across the pieces; (e) drying the colored pieces by introducing a drying gas into the mixing pan, thereby forming dried colored pieces with the random variation in colorant particle density across said pieces; and (f) optionally, repeating steps (c), (d) and (e) at least once, preferably with an edible dry colorant of a different color. Using the inventive process, each colored confectionery piece has its own unique appearance. The randomness by which the colorant or colorants are applied to the surface creates a faux marbled colored appearance, where the color intensity and distribution of the colorant or colorants vary across the surface, making each piece different. In contrast, typical panning methods produce confectionery pieces that have a more uniform surface coloration.

In one particularly preferred embodiment, a protectant coating is applied to surround the color adherent coating after step (e) or (f). Ideally, a confectionery glaze is used as the protectant coating.

Steps (c), (d) and (e) may be repeated multiple times. Preferably, steps (c), (d) and (e) are repeated at least two times, and, more preferably, these steps are repeated with edible dry colorants of different colors. Typically, each cycle will take about 15 minutes to complete. With each cycle, a colored layer is applied to the surface of the chocolate piece.

It should be understood that the edible dry colorant applied in step (f) may be the same color or a different color than the edible dry colorant applied in step (d). If the same color is used, a more pronounced color becomes apparent on the marbled surface. If different colors are used, a variegated or multicolored appearance becomes apparent on the marbled surface. In preferred embodiments, the steps are repeated until the chocolate is substantially covered such that none of the chocolate is visible on the surface of the product and more than one color is visible on the surface of the product.

As the chocolates pieces tumble and roll in the mixing pan, the color adherent coating solution spreads among the pieces. The coating solution is highly tacky and creates a pulling action between the pieces as they come in contact with one another. This causes the edible colorant to spread in a haphazard random fashion on the pieces, where the colorant is picked up as it is applied and transferred from piece to piece as pieces rub against one another. This creates the random non-continuous adhesive pattern, e.g., marbled pattern, characteristic of the panned confectionery product of the invention.

In a preferred embodiment, the process implements the drying step immediately after the edible colorant is applied. Typically, drying gas is applied in less than about 30 seconds after the edible colorant is applied. More preferably, drying gas is applied between about 15 to about 30 seconds after applying the edible colorant. When a water-soluble colorant is used, it is important that the drying step be performed quickly so that the colorant particles remain as individual particles visible on the surface. Otherwise, if drying is performed slowly, the colorant particles may dissolve into the color adherent solution, reducing the color intensity of the colorant and leaving the chocolate surface partially exposed.

The application of the color adherent coating solution may be performed using any suitable device that is capable of delivering the coating by pouring, pumping, spraying, or gravity feeding.

Similarly, the application of the edible colorant may be accomplished by any suitable means of feeding the edible colorant into the pan. For example, the edible colorant may be applied by hand application or gravity feed when in powder form. If the edible colorant is in a liquid form, e.g., suspension or solution, the colorant may be applied by pouring, pumping, spraying, or gravity feeding.

Drying is accomplished by introducing a drying gas into the mixing pan. Typically, air is employed as the drying gas. The air is generally applied at a temperature of about −20° to about 40° C., preferably about 12° to about 23° C., and has a relative humidity of about 15% to about 75% RH, preferably about 32% to about 60% RH. Ideally, the air temperature is about 17° C. and the relative humidity is about 40% RH.

The surface appearance of the panned confectionery product of the invention is characterized by one or more colors of varying density caused by distributing particles of colorant or colorants around and across the product's surface at random points. Preferably, the confectionery product has multiple colored areas of dramatically varying size and shape across the surface of the product as a result of the random distribution and varying density of the colorant particles. This results in the formation of a random distribution of opaque colors, which creates a unique faux marbled appearance. In one embodiment, the panned confectionery product has a variegated or multicolored marbled surface. Preferably, two or more colors make up the marbled surface. The marbled surface may even resemble a vignette, creating the effect of one color gradually fading into another by decreasing the density of the one color and increasing the density of the other color across the surface.

The amount of color adherent coating solution on the chocolate piece of the invention is about 0.3 percent by weight (wt. %) to about 2 wt. % per layer based on the total weight of the chocolate piece. Preferably, from about 0.5 wt. % to about 1 wt. %, and more preferably, from about 0.7 wt. % to about 0.9 wt. % per layer based on the total weight of the chocolate piece.

The amount of the edible colorant on the chocolate piece of the invention is about 0.02 wt. % to about 0.2 wt. % per layer based on the total weight of the chocolate piece. Preferably, from about 0.04 wt. % to about 0.17 wt. %, more preferably, from about 0.06 wt. % to about 0.13 wt. %, most preferably, from about 0.08 wt. % to about 0.10 wt. % per layer based on the total weight of the chocolate piece.

In an alternative embodiment, a process for manufacturing a panned confectionery product of the invention comprises the steps of (a) providing a mass of chocolate pieces to a mixing pan; (b) mixing the mass of chocolate pieces in the mixing pan; (c) applying, in a simultaneous manner, an effective amount of a color adherent coating solution selected from the group consisting of a chocolate polish or a confectionery glaze, and an effective amount of an edible colorant to the mass of chocolate pieces, thereby forming colored pieces wherein the colorant is randomly distributed on the chocolate pieces providing a random variation in colorant particle density across the pieces; (d) drying the colored pieces by introducing a drying gas into the mixing pan, thereby forming dried colored pieces with the random variation in colorant particle density across the pieces; and (e) optionally, repeating steps (c) and (d) at least once, preferably with an edible colorant of the same color. An example of the panned confectionery product that results from this process is shown in FIG. 3.

In one embodiment, an edible colorant is included in the color adherent coating solution. The amount of edible colorant is about 5 wt. % to about 15 wt. % based on the total weight of the color adherent coating solution. Preferably, from about 7 wt. % to about 12 wt. %, and more preferably, about 10 wt. % based on the total weight of the color adherent coating solution. The color adherent coating solution in this embodiment would be applied to the chocolate piece using the weight percentages discussed above.

In this particular embodiment, the color adherent coating solution and the edible colorant are applied simultaneously rather than in a sequential fashion.

Steps (c) and (d) may be repeated more than once. Preferably, steps (c) and (d) are repeated at least two times, and, more preferably, these steps are repeated with an edible colorant of the same color. Typically, it takes about 15 minutes to cycle through steps (c) and (d). With each cycle, a layer of color is formed on the surface of the chocolate piece.

It should be understood that the edible colorant applied in step (e) may be the same color or a different color than the edible colorant applied in step (c); preferably, the edible colorants are the same color.

Optionally, a protectant coating such as a confectionery glaze may be applied to surround the color adherent coating after step (d) or (e).

Drying gas processing parameters and processing cycle times remain the same for the simultaneous application embodiment as for the sequential application embodiment described above.

In another aspect of the invention, one or more flavors may be incorporated into the confectionery product by adding the flavor to the color adherent coating solution, the edible colorant and/or the protectant coating. Generally, any flavor suitable for flavoring confectionery products may be used. The flavor may be added as a liquid or as a powder.

EXAMPLE 1

A mixing pan was charged with 5 lbs. of chocolate-coated peanut pieces. The pan was turned on to begin mixing the pieces. 20 grams of CAPOL® 120C was poured by hand onto the tumbling chocolate-coated peanut pieces to wet the product. After about 15 seconds, 2 grams of a blue lake color in dry powder form was sprinkled by hand onto the tumbling pieces. Within 30 seconds of applying the color, air was introduced into the pan to dry the coating. The airflow was then shut off and 20 grams of CAPOL® 120C was again applied to the pieces. Once the pieces were wetted, 2 grams of a silver lake color was applied. Within 30 seconds of applying the color, air was introduced to dry the coating. This was followed by shutting off the airflow, applying 20 grams of CAPOL® 120C to wet the pieces, then adding 1 gram of red lake color and applying drying air within 30 seconds of adding the color. Each cycle of applying the CAPOL® 120C, applying the color, and drying the tumbling pieces with air required about 15 minutes. The product was finished by applying 8 grams of CAPOL® 153D (confectionery glaze) to wet the pieces with no airflow to the pan, and subsequently drying the pieces with air for 15 minutes. The air used to dry the coating on the pieces throughout the process was at a temperature of 17° C., a relative humidity of 40% RH, and a flow rate of about 45.3 m$^3$/min (1600 cfm).

EXAMPLE 2

A mixing pan was charged with 5 lbs. of white chocolate-coated almond pieces. The pan was turned on to begin mixing the pieces. A flavored color adherent coating solution made of 25 grams of CAPOL® 127C and 2.5 grams of cherry flavor mixed with a lab-scale Lightnin® mixer was poured by hand onto the tumbling pieces to wet the product. After about 15 seconds, 2 grams of a red lake color in dry powder form was sprinkled by hand onto the tumbling pieces. Within 30 seconds of applying the color, air was introduced into the pan to dry the coating. This was followed by shutting off the airflow and again applying 25 grams of CAPOL® 127C and 2.5 grams of cherry flavor to the pieces. Once the pieces were wetted, 2 grams of an orange lake color was applied. Within 30 seconds of applying the color, air was introduced to dry the coating. Again, the airflow was shut off and 25 grams of CAPOL® 127C and 2.5 grams of cherry flavor was applied to wet the pieces; then 2 grams of a maroon lake color was added, and air was applied within 30 seconds of adding the color. Each cycle of applying the CAPOL® 127C and cherry flavor, applying the color, and drying the tumbling pieces with air required about 15 minutes. Lastly, 5 grams of CAPOL® 150C (confectionery glaze) was applied to finish the product, which was dried for 15 minutes. The air used to dry the coating on the pieces throughout the process was at a temperature of 17° C., a relative humidity of 40% RH, and a flow rate of about 45.3 m$^3$/min (1600 cfm).

EXAMPLE 3

A mixing pan was charged with 5 lbs. of white chocolate-coated almond pieces. The pan was turned on to begin mixing the pieces. A color adherent coating solution was prepared by blending together 200 grams of CAPOL® 120C and 20 grams of red sugar-based dispersion using a high shear mixer. 20 grams of the color adherent coating solution was poured by hand onto the tumbling pieces to wet the product, and air was applied to dry the wetted colored pieces. After about 15 minutes, the airflow was shut off and 15 grams of the color adherent coating solution was again applied. Air was reintroduced to the pan to dry this second coating. This was followed by applying 12 grams of the color adherent coating solution with no airflow, and subsequently air drying for 15 minutes. Lastly, 5 grams of CAPOL® 150C (confectionery glaze) was applied with no airflow to finish the product, which was then dried for 15 minutes. The air used to dry the coating on the pieces throughout the process was at a temperature of 17° C., a relative humidity of 40% RH, and a flow rate of about 45.3 cubic m$^3$ min (1600 cfm).

EXAMPLE 4

The process of Example 3 was repeated with the exception that the color adherent coating solution was made with 200 grams of CAPOL® 120C and 20 grams of a red lake aqueous-based dispersion. The two components were blended together using a high shear mixer. The process steps of Example 3 were followed. The resulting panned confectionery product had a colored marbled surface substantially the same as the product of Example 3.

EXAMPLE 5

The process of Example 1 was repeated with the exception that a composite "pearl effect" pigment was applied three times to the pieces in place of the three different lake colors. Specifically, CANDURIN® Blue Shimmer Pearl Effect Color (supplied by EMD Chemicals Inc., Pigments Division, Hawthorne, N.Y., USA) was applied to the tumbling pieces with no airflow after each application of CAPOL® 120C. The process steps of Example 1 were followed. The resulting panned confectionery product had a colored pearlescent marbled surface.

EXAMPLE 6

The process of Example 1 was repeated with the exception that a composite "pearl effect" pigment was applied to the pieces in addition to the three different lake colors. Specifically, a fourth aliquot of 20 grams of CAPOL® 120C was applied to wet the tumbling pieces after the steps of applying the red lake color and air-drying the pieces. Once the pieces were wetted, 2 grams of CANDURIN® Silver Fine Pearl Effect Color (supplied by EMD Chemicals Inc., Pigments Division, Hawthorne, N.Y., USA) was applied. Within 30 seconds of applying the pigment, air was introduced to dry the coating. This additional cycle of applying the CAPOL® 120C, applying the pigment, and drying with air required about 15 minutes. The product was finished with a final confectionery glaze coating as in Example 1.

EXAMPLE 7

A mixing pan was charged with 6 lbs. of white chocolate-coated almond pieces. The pan was turned on to begin mixing the pieces. A flavored color adherent coating solution was prepared by blending together 80 grams of CAPOL® 149C, 10 grams of red sugar-based dispersion, and 10 grams of black cherry flavor using a high shear mixer. 10 grams of the flavored color adherent coating solution was poured by hand onto the pieces to wet the product, and air was applied to dry the wetted colored pieces. After about 15 minutes, the airflow was shut off and 10 grams of the flavored color adherent coating solution was again applied. Air was then reintroduced to dry the wetted pieces. Three more cycles of applying coating solution followed by air drying were performed, for a total of five cycles. The drying conditions and the finishing step were the same as in Example 2.

While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims. All patent applications, patents, and other publications cited herein are incorporated by reference in their entirety.

What is claimed is:

1. A process for providing colored confections, comprising the steps of:
   simultaneously applying an edible dry colorant and a color adherent coating solution to a mixing pan having a mass of chocolate pieces therein to provide colored-chocolate pieces having a random variation in colorant particle density across the chocolate surface of said pieces;
   wherein the edible dry colorant consists of a dye and/or colorant having an average particle size of less than about 150 microns and wherein the process does not include forming a hard panned sugar shell on the chocolate pieces.

2. The process of claim 1, further comprising mixing the chocolate pieces.

3. The process of claim 1, further comprising drying said colored chocolate pieces by introducing a drying gas into the mixing pan.

4. The process of claim 1, wherein the steps of applying the color adherent coating solution and/or applying the edible dry colorant are repeated one or more times.

5. The process of claim 3, wherein the steps of applying the color adherent coating solution, applying the edible dry colorant, and/or drying said colored chocolate pieces are repeated one or more times.

6. The process of claim 1, wherein at least 50% of the particles of the edible dry colorant remain undissolved in the color adherent solution.

7. The process of claim 3, wherein at least 50% of the particles of the edible dry colorant remain undissolved in the color adherent solution.

8. The process of claim 7, wherein said drying gas is applied in less than about 30 seconds after said colorant is applied.

9. The process of claim 1, further comprising the step of applying a protectant coating after either or both applying steps.

10. The process of claim 5, further comprising the step of applying a protectant coating after any applying or drying step.

11. The process of claim 1, wherein the color adherent coating solution is selected from the group consisting of a chocolate polish and a confectionery glaze.

12. The process of claim 11, wherein the color adherent coating solution is a chocolate polish consisting of an aqueous based gum system.

13. The process of claim 11, wherein the color adherent coating solution is a confectionery glaze consisting of one or more shellacs, resins, or natural waxes.

14. The process of claim 1, wherein the edible dry colorant is a pigment, a lake color, or a powdered dye.

15. The process of claim 1, wherein the edible dry colorant is in a dry powder form.

* * * * *